United States Patent
Andrew et al.

(10) Patent No.: US 10,598,559 B2
(45) Date of Patent: Mar. 24, 2020

(54) PRESSURE SENSOR ASSEMBLY

(71) Applicant: Rosemount Inc., Shakopee, MN (US)

(72) Inventors: David Alexander Andrew, Wenatchee, WA (US); David Matthew Strei, Waconia, MN (US)

(73) Assignee: ROSEMOUNT INC., Shakopee, MN (US)

(*) Notice: Subject to any disclaimer, the term of this patent is extended or adjusted under 35 U.S.C. 154(b) by 292 days.

(21) Appl. No.: 15/636,886

(22) Filed: Jun. 29, 2017

(65) Prior Publication Data
US 2019/0003914 A1    Jan. 3, 2019

(51) Int. Cl.
*G01L 19/14* (2006.01)
*G01L 19/06* (2006.01)
(Continued)

(52) U.S. Cl.
CPC .......... *G01L 19/147* (2013.01); *G01L 1/2281* (2013.01); *G01L 9/0075* (2013.01);
(Continued)

(58) Field of Classification Search
CPC ..... G01L 19/147; G01L 7/08; G01L 19/0618; G01L 19/0645; G01L 19/0069; G01L 1/2281; G01L 9/00
(Continued)

(56) References Cited

U.S. PATENT DOCUMENTS 3,780,574 A    12/1973  Miller
3,943,915 A *   3/1976  Severson ............... A61B 5/031
                                                      600/561
(Continued)

FOREIGN PATENT DOCUMENTS

CA       2 850 873       11/2014
CN       101532889        9/2009
(Continued)

OTHER PUBLICATIONS

Notification of Transmittal of the International Search Report and the Written Opinion of the International Searching Authority from PCT/US2018/025798, dated Oct. 22, 2018.
(Continued)

*Primary Examiner* — Robert R Raevis
(74) *Attorney, Agent, or Firm* — Westman, Champlin & Koehler, P.A.

(57) ABSTRACT

A pressure sensor assembly for use in sensing a pressure of a process fluid in a high temperature environment includes an elongate sensor housing configured to be exposed to the process fluid and having a cavity formed therein. A pressure sensor is positioned in the cavity of the elongate sensor housing. The pressure sensor has at least one diaphragm that deflects in response to applied pressure and includes an electrical component having an electrical property which changes as a function of deflection of the at least one diaphragm which is indicative of applied pressure. A flexible membrane in contact with the at least one diaphragm is disposed to seal at least a portion of the cavity of the sensor housing from the process fluid and flexes in response to pressure applied by the process fluid to thereby cause deflection of the at least one diaphragm.

21 Claims, 6 Drawing Sheets

(51) Int. Cl.
  *G01L 19/00* (2006.01)
  *G01L 9/00* (2006.01)
  *G01L 1/22* (2006.01)

(52) U.S. Cl.
  CPC ...... *G01L 19/0038* (2013.01); *G01L 19/0069* (2013.01); *G01L 19/0645* (2013.01); *G01L 9/00* (2013.01)

(58) Field of Classification Search
  USPC .......................... 73/706, 708, 715–731, 756
  See application file for complete search history.

(56) References Cited

U.S. PATENT DOCUMENTS

| | | | |
|---|---|---|---|
| 4,064,549 | A | 12/1977 | Crtezler |
| 5,134,887 | A | 8/1992 | Bell |
| 5,201,228 | A | 4/1993 | Kojima et al. |
| 5,231,880 | A | 8/1993 | Ward et al. |
| 5,323,656 | A | 6/1994 | Fung et al. |
| 5,614,678 | A | 3/1997 | Kurtz et al. |
| 5,637,802 | A | 6/1997 | Frick et al. |
| 5,665,899 | A | 9/1997 | Willcox |
| 5,693,887 | A * | 12/1997 | Englund ............ G01L 19/0023 310/338 |
| 5,731,522 | A | 3/1998 | Sittler |
| 5,741,974 | A | 4/1998 | Uemura |
| 5,869,766 | A | 2/1999 | Cucci et al. |
| 5,922,609 | A * | 7/1999 | Kellner ................. G01N 21/75 436/100 |
| 5,996,418 | A | 12/1999 | Rector et al. |
| 6,079,276 | A | 6/2000 | Frick et al. |
| 6,082,199 | A | 7/2000 | Frick et al. |
| 6,089,097 | A | 7/2000 | Frick et al. |
| 6,233,374 | B1 | 5/2001 | Ogle et al. |
| 6,425,290 | B2 | 7/2002 | Willcox et al. |
| 6,484,316 | B1 | 11/2002 | Lindberg |
| 6,484,585 | B1 | 11/2002 | Sittler et al. |
| 6,505,516 | B1 | 1/2003 | Frick et al. |
| 6,508,129 | B1 | 1/2003 | Sittler |
| 6,516,671 | B2 | 2/2003 | Romo et al. |
| 6,520,020 | B1 | 2/2003 | Lutz et al. |
| 6,561,038 | B2 | 5/2003 | Gravel et al. |
| 6,591,683 | B1 | 7/2003 | Yutani et al. |
| 6,591,686 | B1 | 7/2003 | Kurtz |
| 6,612,174 | B2 | 9/2003 | Sittler et al. |
| 6,718,830 | B1 | 4/2004 | Johnson |
| 6,848,316 | B2 | 2/2005 | Sittler et al. |
| 6,928,880 | B2 | 8/2005 | Kang et al. |
| 6,932,154 | B2 | 8/2005 | Zillinger |
| 6,955,089 | B2 | 10/2005 | Otsuka et al. |
| 7,263,891 | B2 | 9/2007 | Oda |
| 7,389,685 | B2 | 6/2008 | Kosht et al. |
| 7,484,418 | B1 | 2/2009 | Kurtz |
| 7,562,580 | B2 | 7/2009 | Rezgui et al. |
| 7,779,698 | B2 | 8/2010 | Willcox |
| 7,787,128 | B2 | 8/2010 | Lopushansky |
| 8,015,881 | B2 | 9/2011 | Motoyama |
| 8,141,428 | B2 | 3/2012 | Lohr et al. |
| 8,276,459 | B2 | 10/2012 | Kurtz et al. |
| 8,701,496 | B1 | 4/2014 | Brown |
| 8,899,105 | B2 | 12/2014 | Kirikera et al. |
| 9,459,170 | B2 | 10/2016 | Haywood |
| 9,581,513 | B2 | 2/2017 | Miyashita |
| 2003/0182783 | A1 | 10/2003 | Kuroda et al. |
| 2005/0034526 | A1 | 2/2005 | Shinyama et al. |
| 2010/0212396 | A1 | 8/2010 | Zenisek |
| 2010/0257937 | A1 | 10/2010 | Kurtz |
| 2015/0000417 | A1 | 1/2015 | Hedtke et al. |
| 2015/0122040 | A1* | 5/2015 | Drewes ................. G01L 9/0072 73/724 |
| 2017/0038269 | A1 | 2/2017 | Hio et al. |

FOREIGN PATENT DOCUMENTS

| | | |
|---|---|---|
| CN | 101545816 | 9/2009 |
| CN | 104483048 | 4/2015 |
| DE | 40 26 855 | 3/1992 |
| EP | 0 699 821 | 6/1996 |
| EP | 2 002 233 | 5/2012 |
| JP | H 11-47330 | 6/1989 |
| JP | H 7-239282 | 9/1995 |
| KR | 100943325 | 2/2010 |
| SU | 1424636 * | 6/1973 |
| WO | WO 2013/051199 | 4/2013 |
| WO | WO 2014/197843 | 12/2014 |
| WO | WO 2015/098324 | 7/2015 |
| WO | WO 2016/057143 | 4/2016 |

OTHER PUBLICATIONS

Article entitled "Quartz Pressure Transducer Technologies" by Roger Ward et al., Quartzdyne, Inc. 1997.
Invitation to Pay Additional Fees and, Where Applicable, Protest Fee from PCT/US2018/025798, dated Jul. 13, 2018.

* cited by examiner

PRESSURE SENSOR ASSEMBLY

BACKGROUND

The present invention relates to sensing a process variable of an industrial process. More specifically, the present invention relates to sensing a pressure of a process fluid used in such an industrial process.

Pressure sensors are used to measure pressures. One technique which is used to measure pressure is through a deflectable diaphragm. A pressure is applied to one side of the diaphragm to cause the diaphragm to deflect. The deflection of the diaphragm is proportional to the applied pressure. Diaphragm deflection can be measured by configuring the diaphragm so that it acts as a plate of a capacitor. The capacitance of the diaphragm assembly changes based upon the diaphragm position. Therefore, capacitance can be related to diaphragm position which in turn is representative of the pressure applied to the diaphragm.

Pressure sensors frequently operate in harsh environments. Such environments can cause failure in highly accurate pressure sensors which tend to be quite delicate. One such technique uses an isolation diaphragm in which process fluid is on one side of the isolation diaphragm and an isolation (or "fill") fluid is on the other side. The isolation fluid contacts the pressure sensor diaphragm. As the process fluid pressure changes, the isolation diaphragm, responsively deflects which causes the change in pressure to be transferred through the isolation fluid to the sensor diaphragm. However, the isolation fluid in the diaphragm can introduce errors in pressure measurements and can be altered over time or due to application of heat or other external influences. Further, the fluid can leak with time which can result in reduced fluid volume or isolation fluid which has been contaminated by process fluid. Both a fluid leak or contamination cause errors in pressure measurement. Another example pressure sensing technique uses an elongate pressure sensor of a brittle material which is covered by a protective element such as that shown an described in U.S. Pat. No. 6,848,316, entitled PRESSURE SENSOR ASSEMBLY and assigned to Rosemount Inc.

SUMMARY

A pressure sensor assembly for use in sensing a pressure of a process fluid in a high temperature environment includes an elongate sensor housing configured to be exposed to the process fluid and having a cavity formed therein. A pressure sensor is positioned in the cavity of the elongate sensor housing. The pressure sensor has at least one diaphragm that deflects in response to applied pressure and includes an electrical component having an electrical property which changes as a function of deflection of the at least one diaphragm which is indicative of applied pressure. A flexible membrane in contact with the at least one diaphragm is disposed to seal at least a portion of the cavity of the sensor housing from the process fluid and flexes in response to pressure applied by the process fluid to thereby cause deflection of the at least one diaphragm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
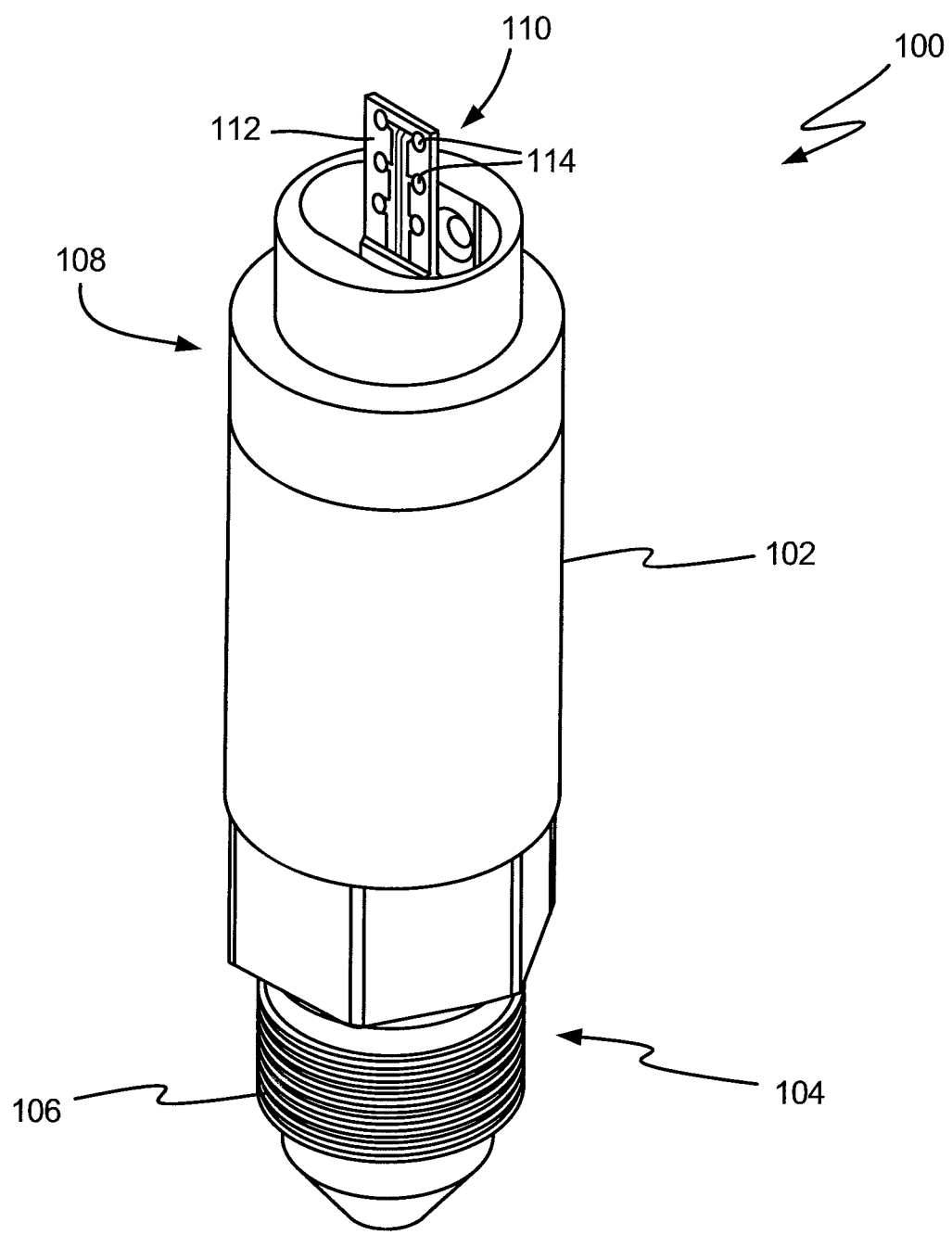
FIG. 1 is a perspective view of a pressure sensor assembly in accordance with one configuration.

As discussed in the Background Section, pressure sensors are used to sense pressures of process fluids. In some configurations, the pressure sensor and the pressure sensor assembly used to support the pressure sensor must be configured to withstand harsh conditions including high temperatures and caustic environments. One technique used in such environments is to isolate the pressure sensor from the process using a substantially incompressible isolation fill fluid. The isolation fill fluid is separated from the process fluid using a deflectable diaphragm or bellows assembly. This isolates the pressure sensor from the harsh environment of the process which may include corrosive fluids, abrasive particles, conductive medium, etc. Such configurations typically use an isolation fluid that hydraulically transfers the pressure applied to the diaphragm or bellows to the pressure sensing element. The properties of the fill fluid dictate the accuracy of the system with respect to variations in pressures and temperatures due to factors such as vapor pressure, thermal expansion, compressability, decomposition and the ability of the device to retain the isolation fluid. Further, these methods require that the sensor be in a pressure containing environment such that any electrical connections to the sensor must be fed through compressive seals of sufficient strength to retain the process pressures. This adds additional complexity to the device. Further, in the case of many systems, thermal variations between the pressure sensor and a reference component used to normalize the output can lead to large thermal transient errors Most pressure sensors measure the difference in pressure between a process (pressure of interest) and a reference. For gage pressure, the reference used is atmospheric pressure. For absolute pressure, the reference is an evacuated cavity (0 pressure). Most pressure sensors also are sensitive to temperature changes (which is an undesired effect). If the temperature of the pressure sensor and its reference are the same, the temperature effect on the pressure measurement is usually small. However, thermal transients can cause a temperature difference between the pressure sensor and its reference, which is erroneously interpreted as a change in pressure.

Such diaphragm isolation systems suffer from a further limitation in that the maximum stress as a function of diaphragm deflection is related to the reciprocal of the square of the diaphragm radius. This increased stress requires that a relatively large fluid compensation material be employed or otherwise addressed using the design process, manufacturing tolerances and requirements of the properties of the fill fluid (oil) which can be prohibitive in smaller diaphragm diameters. Bellows based isolation systems, on the other hand, require more oil and increased length. However, such configurations can be prone to mud, clogging, damage, or other malfunctions due to shock, etc.

The configurations set forth herein do not require an isolation fill fluid and therefore eliminate some of the problems associated with certain prior art designs such as those discussed above. In this configuration, the isolation system directly couples to the pressure sensor. This eliminates the need for an isolation fill fluid thereby simplifying manufacture, reducing failure mechanisms and increasing temperature capability of the device. The temperature capability is only limited by the material used rather than the boiling point, thermal decomposition temperature or melting point of an isolation fill fluid.

Figure 2:
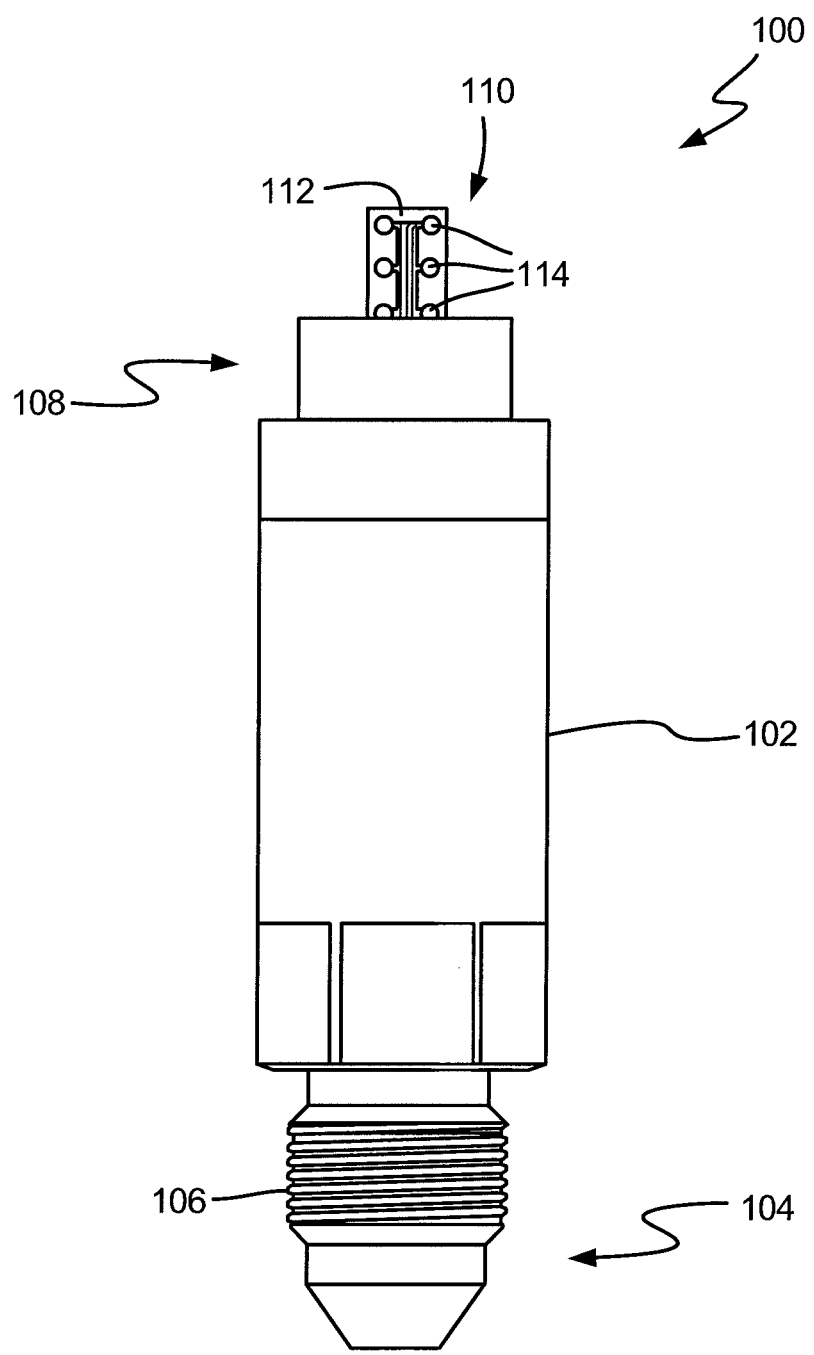
FIG. 2 is a side plan view of the pressure sensor assembly of FIG. 1.

FIG. 1 is a perspective view of a pressure sensor assembly 100 in accordance with one example embodiment. Pressure sensor assembly 100 includes a housing body 102 having a distal process coupling end 104. Process coupling end 104 includes threading such that it may be threadably coupled to process piping or other process vessels as desired. Housing body 102 further includes a proximal end 108 which carries a pressure sensor 110 therein. Pressure sensor 110 includes an electrical connection surface 112 having a plurality of electrical pads 114 carried thereon. Similar to FIG. 1, FIG. 2 is a side plan view of the pressure sensor assembly 100. Note that an opening is provided in the process coupling end 104 that allows process pressure to be applied to an internal cavity of housing body 102.

Figure 3:
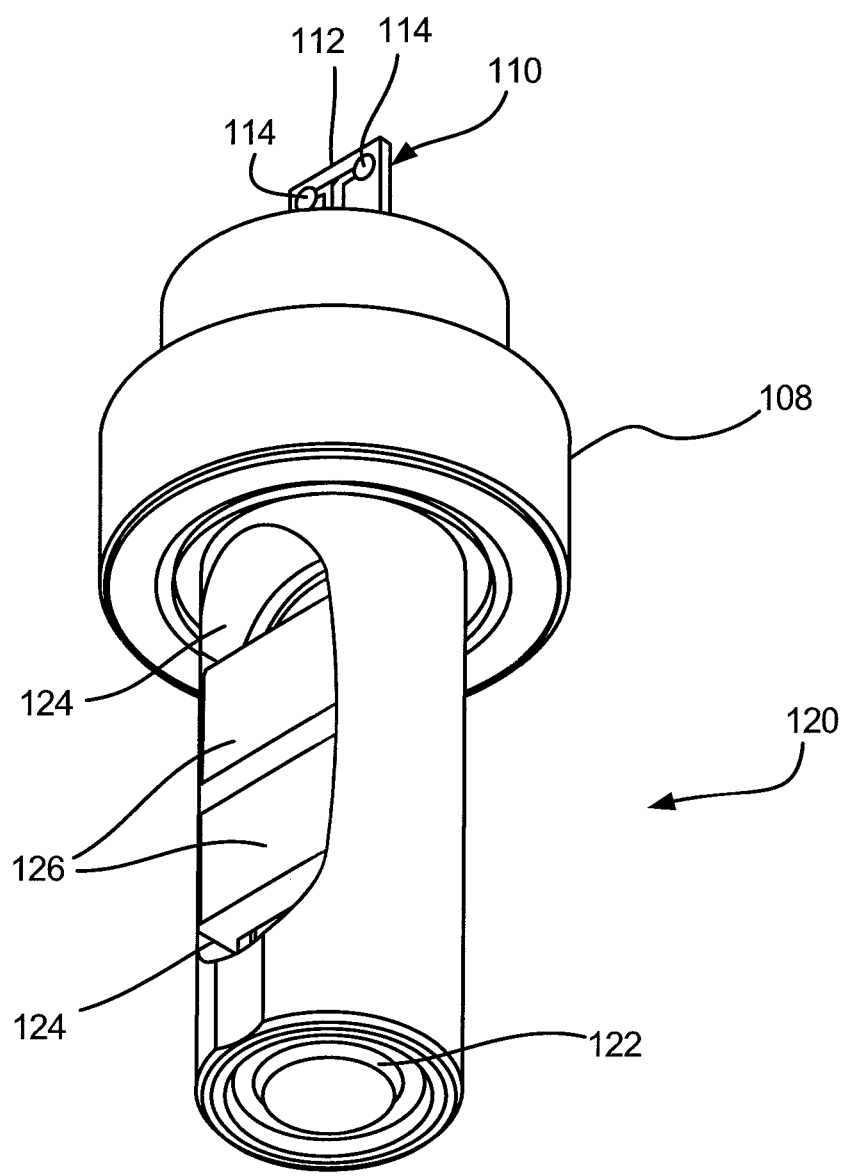
FIG. 3 is a perspective view of an elongate sensor housing carried in the pressure sensor assembly of FIG. 1.

FIG. 3 is a perspective view of an elongate sensor housing 120 which is carried in the housing body 102. Sensor housing 120 includes proximal end 108 (also shown in FIG. 1) which mounts to the housing body 102. Sensor housing 120 is preferably sealed by a plug 122 at a distal end. Further, the pressure sensor 110 is received in a cavity 124 of the sensor housing 120. Support bridges 126 are provided across the cavity or opening 124 for use in reinforcing the structure such that it may withstand high pressure environments.

Figure 4:
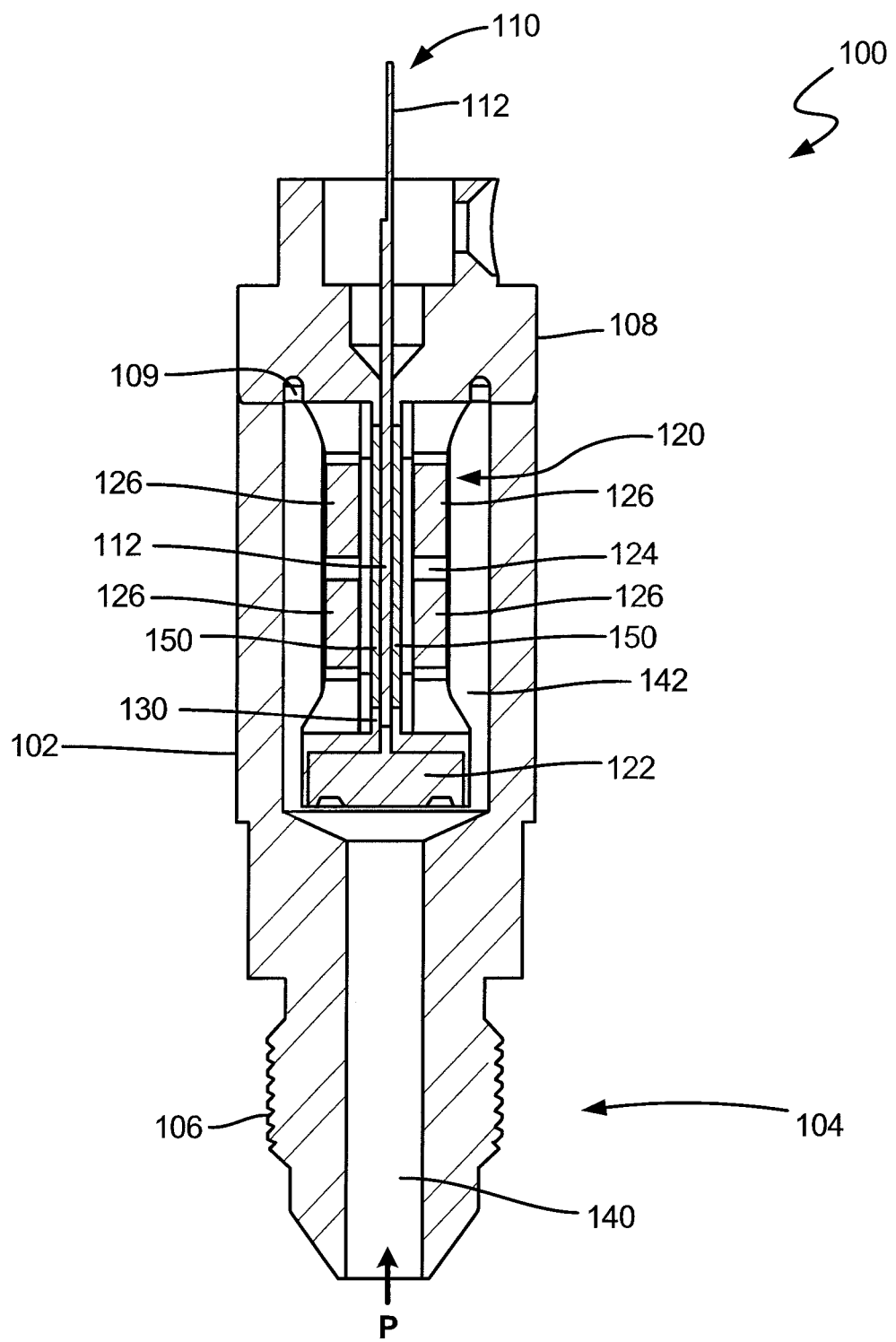
FIG. 4 is a side cross-sectional view of the pressure sensor assembly of FIG. 1.

FIG. 4 is a side perspective view of the pressure sensor assembly 100 and illustrates the elongate sensor housing 120 carried within the housing body 102. In FIG. 4, the pressure sensor 110 can be seen as formed of an elongate structure which is disposed within the sensor housing 120 and is connected at a distal end to mount 130 of the housing 120. A process pressure P is applied at the distal end 104 of the assembly 100 through a pressure port 140. Pressure port 140 opens to an interior cavity 142 of body 102. Further, cavity 142 encloses cavity 124 whereby the applied pressure P is received by the pressure sensor 110. The end cap 122 can be bonded or welded to the sensor housing 120. Similarly, the proximal end 108 of this sensor housing can be welded or otherwise bonded to the housing body 102. FIG. 4 also illustrates a weld relief 109 in this embodiment.

As illustrated in FIG. 4, the sensor body 120 includes flexible membranes 150 positioned on opposite sides of sensor 110. The flexible membranes 150 contact the surface of the pressure sensor 110 whereby the pressure sensor 110 is isolated from the process fluid but is responsive to pressure applied by the process fluid through the flexible membranes 150. Membranes 150 may be formed of any appropriate material that is sufficiently flexible to transmit the pressure signal, strong enough to hold the pressure, and will resist corrosion by the process. The membranes 150 may be fabricated as a single component with the sensor body 120 or may be assembled separately.

Figure 5:
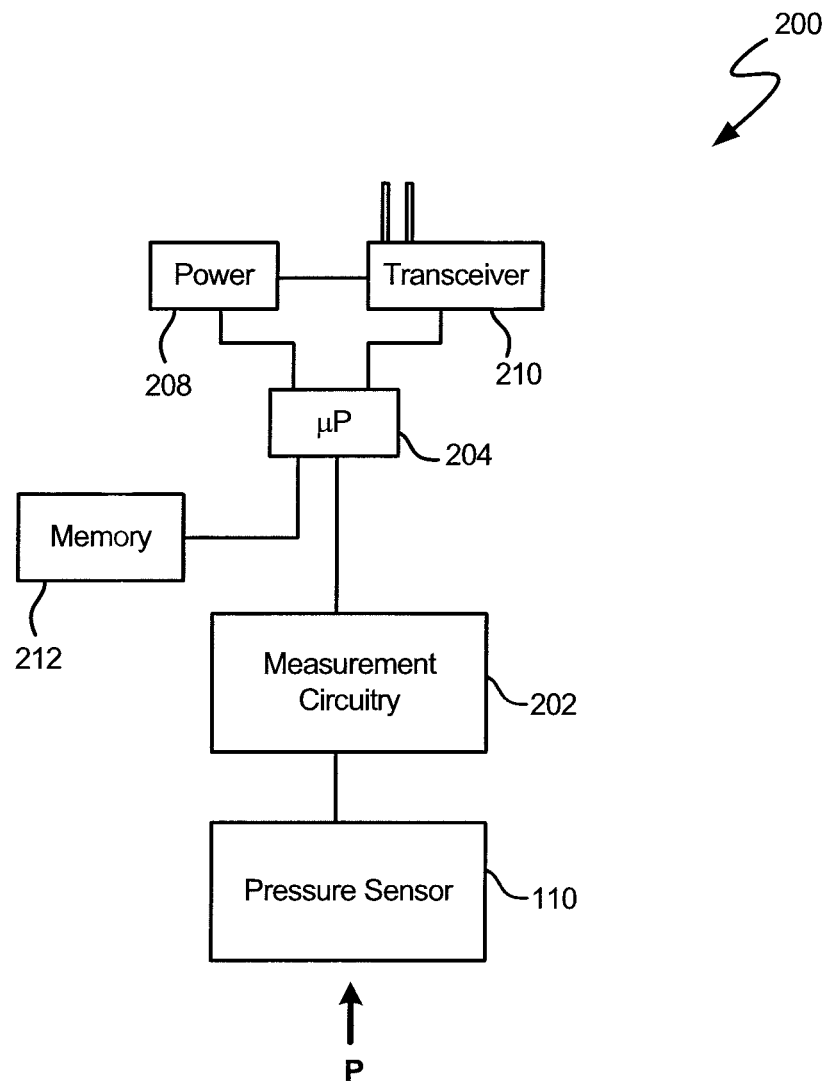
FIG. 5 is a simplified diagram of the pressure sensor assembly of FIG. 1 coupled to a pressure transmitter.

The configuration illustrated herein is well suited for high temperature environments. The outer housing body 102 operates as a process adapter and can be configured as desired for coupling the elongate sensor housing to various types of process fittings. The use of the plug 122 is optional, however, plug 122 does allow the sensor housing 120 to be machined without the use of EDM (Electrical Discharge Machining) and serves to retain pressure. The use of the plug 122 can be employed to allow conventional machining techniques to fabricate the sensing body. Bridges 126 support the structure and prevent the housing from collapsing against the sensor 110. Bridges 126, by preventing the housing from collapsing against the sides of the sensor 110 perpendicular to the sensor diaphragms, also serve to increase the gain of the sensor. Although two flexible membranes 150 are shown, a single membrane may also be employed. In the configuration of sensor 110, two opposed sides of the sensor 110 are responsive to applied pressure. The flexible membranes 150 may be bonded to the sensor 110 using an adhesive or by solid state bonding techniques. Example adhesives include a braze or solder, ceramic or glass. Solid state bonding techniques includes explosion bonding and diffusion bonding. Examples of diffusion bonding include a chromium layer carried on the pressure transducer 110 with a sputtered aluminum layer on the flexible membrane 150. Another example is a chromium layer carried on the transducer 110 with a sputtered or plated nickel layer on the flexible membrane 150. A sputtered aluminum layer on the pressure sensor 110 and a sputtered or plated nickel layer on the flexible membrane 150 may also be used. Another example is a sputtered chromium layer on the pressure sensor 110 and an Inconel® foil flexible membrane 150. A packing material may also be loaded against the transducer 110 to secure it in the housing 120. For example, a ceramic powder or sintered nanoparticle silver may be used. The interior of the housing 120 may also be formed in a vacuum. For example, membrane 150 can be shaped as desired and fitted with the housing 120. A laser weld can be used to seal the membrane 150 to the housing. Any sealing technique may be used as appropriate including a seam weld or resistive weld. The flexible membrane 150 may also comprise a preformed metal foil and may be attached to the sensor housing 120 through welding, a metal to metal seal, or adhered to the sensor housing. A soft metal may also be deposited on the inside surface of the flexible membranes 150 through plating or the like to allow tighter coupling to the pressure sensor 110. For example, a gold plating can be used on the inside surface of a metal foil on the inside surfaces of the flexible membranes FIG. 5 is a simplified block diagram showing a pressure transmitter 200 including pressure sensor 110. In this embodiment, pressure transmitter 200 includes measurement circuitry 202 configured to couple to an output from the pressure sensor 110 and provide a measurement signal to a microprocessor 204. The measurement circuitry 202 may include an analog to digital converter as well as compensation circuitry, filtering circuitry, among other items. Power is provided by power supply 208. The microprocessor 204 operates in accordance with instructions stored in memory 212. Typically, the process variable transmitter will be configured in which all of the electronics of the transmitter 200 are sealed in a hermetically sealed housing. The microprocessor may couple to a UART transceiver 210 with communication a communication standard of RS-485, or RS-232 and input power conditioning. Microcontrollers may also be used such that the memory 212 and UART 210 are within the micro controller block. An RS-485 Transceiver may be coupled to the UART. Two microcontrollers may be implemented in which one interprets the signal from the measurement circuitry and the other receives the data from the first microcontroller and communicates with the outside world.

Figure 6A:
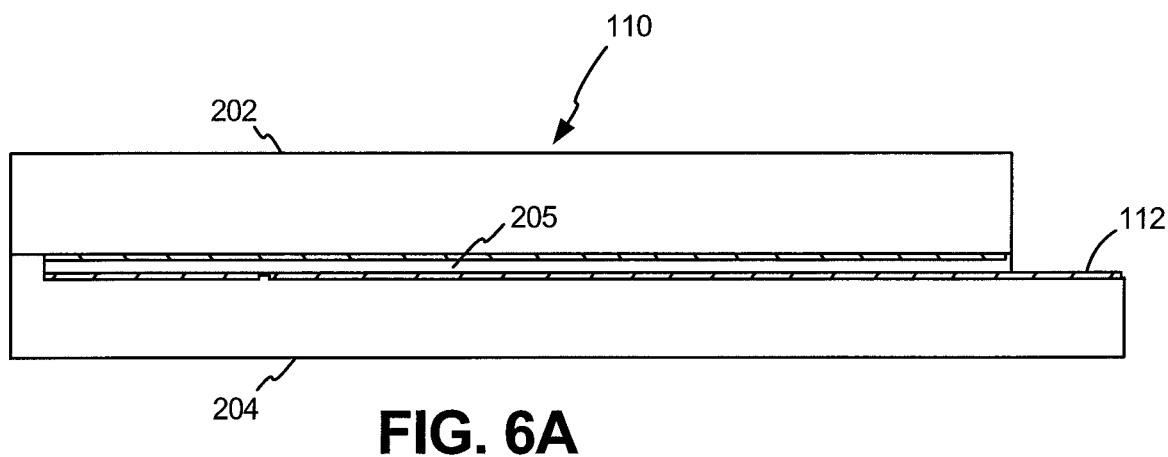
FIG. 6A is a side cross-sectional view of a pressure sensor.
Figure 6B:
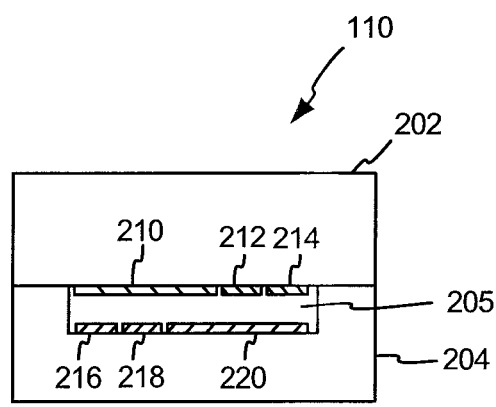
FIG. 6B is an end cross-sectional view of the pressure sensor of FIG. 6A.

The specific pressure sensor may be in accordance with any desired configuration. Various pressure sensor designs are known in the art. One type of pressure sensor is formed of an elongate substantially brittle material. The sensor itself can be fabricated of a corrosion resistance material such as sapphire. FIG. 6A is a side cross-sectional view and FIG. 6B is an end cross-sectional view of pressure sensor 110. As illustrated in FIGS. 6A and 6B, elongate members 202 and 204 form opposed diaphragms which are fabricated to include a cavity 205 formed therein. Metal layers 210, 212, 214, 216, 218 and 220 are deposited on an interior surface of diaphragms 202 and 204 in the cavity 205. As a pressure is applied to diaphragms 202 and 204, the spacing between plates 210-220 changes as the volume of the cavity 205 changes. This change in spacing appears as a change in electrical capacitance which can be measured by appropriate measurement circuitry such as measurement circuitry 202 shown in FIG. 5. The metallic layers 210-220 may also provide an electrical resistance which varies as a function of temperature whereby temperature measurements may be obtained. Connections to the layers 210-220 can be made through connection surface 112.

Examples of pressure sensors related to that shown in FIGS. 6A and 6B are shown and described in U.S. Pat. No. 5,637,802, issued Jun. 10, 1997; U.S. Pat. No. 6,079,276, issued Jun. 27, 2000; U.S. Pat. No. 6,082,199, issued Jul. 4, 2000; U.S. Pat. No. 6,089,097, issued Jul. 18, 2000; U.S. Pat. No. 6,505,516, issued Jan. 14, 2003; U.S. Pat. No. 6,520,020, issued Feb. 18, 2003; U.S. Pat. No. 6,508,129, issued Jan. 21, 2003; U.S. Pat. No. 6,484,585, issued Nov. 26, 2002; U.S. Pat. No. 6,516,671, issued Feb. 11, 2003; U.S. Pat. No. 6,561,038, issued May 13, 2003; and U.S. Pat. No. 6,484,316, issued Feb. 1, 2005 which are incorporated herein by reference in their entirety.

Although the present invention has been described with reference to preferred embodiments, workers skilled in the art will recognize that changes may be made in form and detail without departing from the spirit and scope of the invention. In one example configuration, a pressure retaining housing is created around a pressure sensor diaphragm with foil diaphragms on either side to thereby transfer the applied pressure to the diaphragms of the pressure sensor. In another example configuration, the sensor is mounted into the housing and mounted to the flexible member using packing material, solid state bonding or adhered by some other means. For example, single or dual diaphragm pressure transducers may be employed. The housing can also be configured such that different pressures are applied to each side of the pressure sensor. An accelerometer or other vibration sensor support may also be employed. This system is well suited for implementation for redundant sensor applications. In addition to high pressure environments, the configuration is well suited for high temperature environments and high corrosive environments. Any appropriate technique may be used to couple the flexible membranes to the housing. For example, a laser welding process can be used to attach flexible members 150 to housing 120 and seal the interior of the housing from the process fluid. Other welding techniques may be used such as TIG welding, seam sealing or projection welding.

What is claimed is:

1. A pressure sensor assembly for use in sensing a pressure of a process fluid in a high temperature environment, comprising:
   an elongate sensor housing configured to be exposed to the process fluid and having a cavity formed therein;
   a pressure sensor positioned in the cavity of the elongate sensor housing, the pressure sensor having at least one diaphragm that deflects in response to applied pressure and further including an electrical component having an electrical property which changes as a function of deflection of the at least one diaphragm and is indicative of applied pressure, the pressure sensor comprising an elongate element extending along a length of the elongate sensor housing;
   a flexible membrane in contact with the at least one diaphragm wherein the flexible membrane seals at least a portion of the cavity of the sensor housing from the process fluid and flexes in response to pressure applied by the process fluid to thereby cause deflection of the at least one diaphragm; and
   a packing material between the flexible membrane and the pressure sensor.

2. The pressure sensor assembly of claim 1 wherein the pressure sensor housing includes bridges configured to provide additional support to the pressure sensor housing.

3. The pressure sensor assembly of claim 1 including a housing body which contains the elongate sensor housing.

4. The pressure sensor assembly of claim 3 wherein the housing body includes a process coupling end.

5. The pressure sensor assembly of claim 1 wherein the pressure sensor includes a capacitor having capacitance which changes in response to applied pressure.

6. The pressure sensor assembly of claim 1 including a plug at a distal end of the elongate sensor housing.

7. The pressure sensor assembly of claim 1 wherein the flexible membrane is bonded to the pressure sensor.

8. The pressure sensor assembly of claim 7 wherein the bond is a diffusion bonding.

9. The pressure sensor assembly of claim 7 wherein the bond includes a chromium layer.

10. The pressure sensor assembly of claim 7 wherein the bond includes an aluminum layer.

11. The pressure sensor assembly of claim 7 wherein the bond includes a nickel layer.

12. The pressure sensor assembly of claim 7 wherein the bond includes a sputtered aluminum layer.

13. The pressure sensor assembly of claim 1 wherein the flexible membrane comprises foil.

14. The pressure sensor assembly of claim 1 wherein the packing material comprises ceramic powder.

15. The pressure sensor assembly of claim 1 wherein the packing material comprises nano particle silver.

16. The pressure sensor assembly of claim 15 wherein the nano particle silver is sintered.

17. The pressure sensor assembly of claim 1 wherein the flexible membrane is formed as an integral component with the elongate sensor housing.

18. The pressure sensor assembly of claim 1 wherein the flexible membrane comprises a separate component coupled to the elongate sensor housing.

19. The pressure sensor assembly of claim 1 including a second flexible membrane configured to apply a pressure to a second side of the pressure sensor.

20. The pressure sensor assembly of claim 1 wherein the flexible membrane is sealed to the elongate sensor housing by at least one of a weld, a metal to metal seal, and an adhesive.

21. The pressure sensor assembly of claim 1 wherein the pressure sensor includes elongate sides which extend in a direction along a length of the elongate sensor housing and wherein the applied pressure is applied to the elongate sides.

* * * * *